United States Patent
Kawan et al.

(10) Patent No.: US 7,039,812 B2
(45) Date of Patent: May 2, 2006

(54) SYSTEM AND METHOD FOR USER AUTHENTICATION

(75) Inventors: Joseph C. Kawan, Hollywood, CA (US); Yosif Smushkovich, Santa Monica, CA (US); Ronald King-Hang Chu, Los Angeles, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 680 days.

(21) Appl. No.: 09/769,844

(22) Filed: Jan. 25, 2001

(65) Prior Publication Data

US 2001/0049785 A1  Dec. 6, 2001

Related U.S. Application Data

(60) Provisional application No. 60/178,175, filed on Jan. 26, 2000.

(51) Int. Cl.
*H04L 9/32* (2006.01)
(52) U.S. Cl. ............... 713/186; 713/182; 380/229; 705/67
(58) Field of Classification Search ........... 713/150, 713/155, 168, 182, 184–186; 380/229, 232, 380/247–250, 258; 705/67; 726/2
See application file for complete search history.

(56) References Cited

U.S. PATENT DOCUMENTS

| | | | | |
|---|---|---|---|---|
| 4,453,074 A | 6/1984 | Weinstein | ...... | 235/380 |
| 4,993,068 A * | 2/1991 | Piosenka et al. | ...... | 713/186 |
| 4,998,279 A | 3/1991 | Weiss | ...... | 380/23 |
| 5,053,608 A | 10/1991 | Senanayake | ...... | 235/380 |
| 5,056,141 A | 10/1991 | Dyke | ...... | 380/25 |
| 5,131,038 A | 7/1992 | Puhl et al. | ...... | 380/23 |
| 5,229,764 A | 7/1993 | Matchett et al. | ...... | 340/825.34 |
| 5,386,104 A | 1/1995 | Sime | ...... | 235/379 |
| 5,657,389 A | 8/1997 | Houvener | ...... | 380/23 |
| 5,731,575 A | 3/1998 | Zingher et al. | ...... | 235/379 |
| 5,764,789 A | 6/1998 | Pare, Jr. et al. | ...... | 382/115 |
| 5,815,252 A | 9/1998 | Price-Francis | ...... | 356/71 |
| 5,838,812 A * | 11/1998 | Pare et al. | ...... | 382/115 |
| 5,870,723 A | 2/1999 | Pare, Jr. et al. | ...... | 705/39 |
| 5,933,515 A | 8/1999 | Pu et al. | ...... | 382/124 |

(Continued)

FOREIGN PATENT DOCUMENTS

JP       10-154231      6/1998

OTHER PUBLICATIONS

"Security Dynamic's One-Two Punch," *Marketing Computers*, p. 26, Dec., 1990.
"ThumbScan Introduces Access Management System for Three Levels of PC Security," News Release, p. 1, Jan. 16, 1989.

(Continued)

*Primary Examiner*—Matthew Smithers
*Assistant Examiner*—Minh Dieu Nguyen
(74) *Attorney, Agent, or Firm*—George T. Marcou; Kilpatrick Stockton LLP

(57) ABSTRACT

A method and system for authenticating the identity of a user by an authority makes use of presenting biometric data for the user in a predetermined shared secret sequence. The method and system can be augmented by requesting an additional shared secret, such as a PIN or additional credentials, to establish multiple layers of authentication. Varying the layers of authentication results in greater or lesser security, and the accuracy for any given layer can be relaxed without compromising the integrity of the entire method.

82 Claims, 8 Drawing Sheets

U.S. PATENT DOCUMENTS

| | | | | |
|---|---|---|---|---|
| 5,978,495 | A | 11/1999 | Thomopoulos et al. | 382/124 |
| 6,018,739 | A | 1/2000 | McCoy et al. | 707/102 |
| 6,038,334 | A | 3/2000 | Hamid | 382/124 |
| 6,072,891 | A | 6/2000 | Hamid et al. | 382/116 |
| 6,185,316 | B1 * | 2/2001 | Buffam | 382/115 |
| 6,189,096 | B1 * | 2/2001 | Haverty | 713/155 |
| 6,269,348 | B1 * | 7/2001 | Pare et al. | 705/39 |
| 6,421,453 | B1 * | 7/2002 | Kanevsky et al. | 382/115 |
| 6,655,585 | B1 * | 12/2003 | Shinn | 235/382 |

OTHER PUBLICATIONS

International Search Report for Application No. PCT/US01/02488, dated Jul. 9, 2001 (mailing date).

Preliminary Examination Report for Application No. PCT/US01/02488, dated Aug. 22, 2002 (mailing date).

Written Opinion for Application No. PCT/US01/02488, dated Feb. 19, 2002 (mailing date).

* cited by examiner

| USER IS OR HAS | USER KNOWS |
|---|---|
| CREDENTIALS | SHARED SECRETS |
| BIOMETRIC | PIN |
| FINGERPRINT | SEQUENCE |
| VOICE | |
| FACE | |
| IRIS | |
| DOCUMENTATION | |
| PAPER | |
| DIGITAL | |

FIG. 2

SYSTEM AND METHOD FOR USER AUTHENTICATION

PRIORITY APPLICATION

This application claims the benefit of U.S. Provisional Application No. 60/178,175 filed Jan. 26, 2000, entitled "System and Method for User Access Authentication," and incorporated herein by this reference.

FIELD OF THE INVENTION

The present invention relates to the field of user authentication systems and more particularly to a method and system of authenticating or verifying the identity of a user using biometric data about the user.

BACKGROUND OF THE INVENTION

The task of authenticating or verifying the identity of a user requires a certain level of security in addition to the method by which the user is identified. A typical authentication system involves, for example, a user who has a smart card or perhaps simply a credit card. When the user presents himself or herself to the system, such as at an automatic teller machine (ATM), the user presents his or her credit card, which identifies the particular user by name and account number. The user then presents his or her personal identification number (PIN), or similar information known only to the user, and the presented information is sent to a host computer. The host computer, which is based on a database, can then identify the user by the user's name and, for example, by the particular PIN that the user is supposed to use.

In the case when biometrics are used for authentication, the identification of the user can be done by presenting a biometric such as a fingerprint, the user's face, or the user's voice, to the system. In addition to that, when the user identifies himself or herself by presenting a biometric, such as a fingerprint, the system goes through the process of looking at a stored template of the user's fingerprint which was created in advance. The system compares the user's presented fingerprint to the stored template and verifies that this is the same person, making its decision based on certain predefined parameters, such as threshold of match scores between the presented and stored biometric samples.

SUMMARY OF THE INVENTION

It is a feature and advantage of the present invention to provide a method and system of authenticate a user with biometric data which allows the use of a high biometric recognition threshold to filter out as many impostors as possible, while at the same time minimizing the rate of false rejections.

It is another feature and advantage of the present invention to provide a method and system of authenticate the user with biometric data which enables a lower rate of false rejections without increasing the rate of false acceptances.

To achieve the stated and other features, advantages and objects, an embodiment of the present invention provides a method and system for authenticating the identity of a user by an authority that makes use of biometric data, which is what the user is, and additional information, which is what the user knows, for example, by presenting the biometric in a predefined manner, such as a predefined sequence. The predefined manner in which the biometric is presented, such as presenting the user's fingerprints in a predefined sequence, functions as the user's PIN. An embodiment of the present invention uses biometric data together with the predetermined sequence of presenting the biometric data to enable the user to gain access to a device, physical location, or network.

The authentication method and system for an embodiment of the present invention can be augmented by requesting an additional shared secret, such as a PIN, or additional credentials, thus establishing multiple layers of authentication. Varying the layers of authentication results in greater or lesser security, and the accuracy for any given layer can be relaxed without compromising the integrity of the entire method. In order to minimize the risk of replay attack, the predetermined sequence may be different for consecutive accesses.

In an embodiment of the present invention, the user presents one or more user credentials for enrollment by an authority, such as a bank. The user credentials include, for example, one or more biometric templates for the user's fingerprint(s), face, voice and/or iris and/or one or more digital documents, such as a digital certificate and/or a digital signature for the user and/or one or more paper documents, such as a passport for the user. The user credential(s), which represent user authentication information, are stored for the user, for example, on a host computer, a local terminal, and/or a user token, such as a smart card, and the stored user credential(s) can be signed with the user's private key.

In addition, one or more shared secrets is established between the user and the authority relating to a predefined shared secret manner for presenting each of one or more current user credentials to the authority, such as a predefined shared secret sequence of presenting the current user credential(s). Information about the predefined shared secret, which functions in a manner analogous to a PIN for the user, is stored for the user in a database. The information about the shared secret(s) can be stored in the same database as the database storing the user credential(s), and both can be stored encrypted and digitally signed.

One or more additional shared secrets for an embodiment of the present invention can include, for example, a predefined shared secret PIN for the user, one or more additional predefined shared secret manner(s) of presenting the current user credential(s) to the authority, a predefined shared secret manner of presenting one or more additional current user credential(s) to the authority for the user, and/or a predefined shared secret manner of presenting each of several additional current user credentials to the authority for the user. In addition, the predefined shared secret manner of presenting each of several additional current user credentials can include one or more variation(s) corresponding to a variation in a degree of security and/or for use on consecutive occasions.

In an embodiment of the present invention, in order to authenticate the identity of the user, the user presents one or more current user credential(s), such as one or more current biometric samples for the user's fingerprint(s), face, voice, and/or iris, to the authority in the predefined shared secret sequence(s). For example, the authority can direct the user to present a biometric sample for one or more user fingerprint(s) in a particular predefined shared secret sequence, or a combination of biometric samples for two or more of the user's fingerprint(s), face, voice, and/or iris in a predefined shared secret sequence. In another aspect, the shared secret manner of presenting the current user credential(s) involves, for example, presenting at least two user credentials by the authority in a predefined shared secret sequence, or in a manner directed by the authority, or in one of several predefined secret sequences randomly selected by the authority.

The authority for an embodiment of the present invention authenticates the identity of the user based on a correspondence between the enrolled and current user credentials and a correspondence between the shared secret manner for presenting the current user credential(s) and the manner in which the current user credential(s) are presented to the authority. The authentication is performed, for example, by the host computer or the local device for activation of a device, such as a gate controller, a door opener, a telephone, or appliance, or for access, such as device access, physical location access, or network access. Other aspects of an embodiment of the present invention involve, for example, authenticating the identity of the user to a smart card or to activate a silent alarm for the user.

Additional objects, advantages and novel features of the present invention will be set forth in part in the description which follows, and in part will become more apparent to those skilled in the art upon examination of the following or may be learned by practice of the invention.

BRIEF DESCRIPTION OF THE DRAWINGS

FIG. 2 is a table which illustrates examples of credentials, which represent what the user is or has, and shared secrets, which represent what the user knows, for the authentication method and system of an embodiment of the present invention;

DETAILED DESCRIPTION

Figure 1:
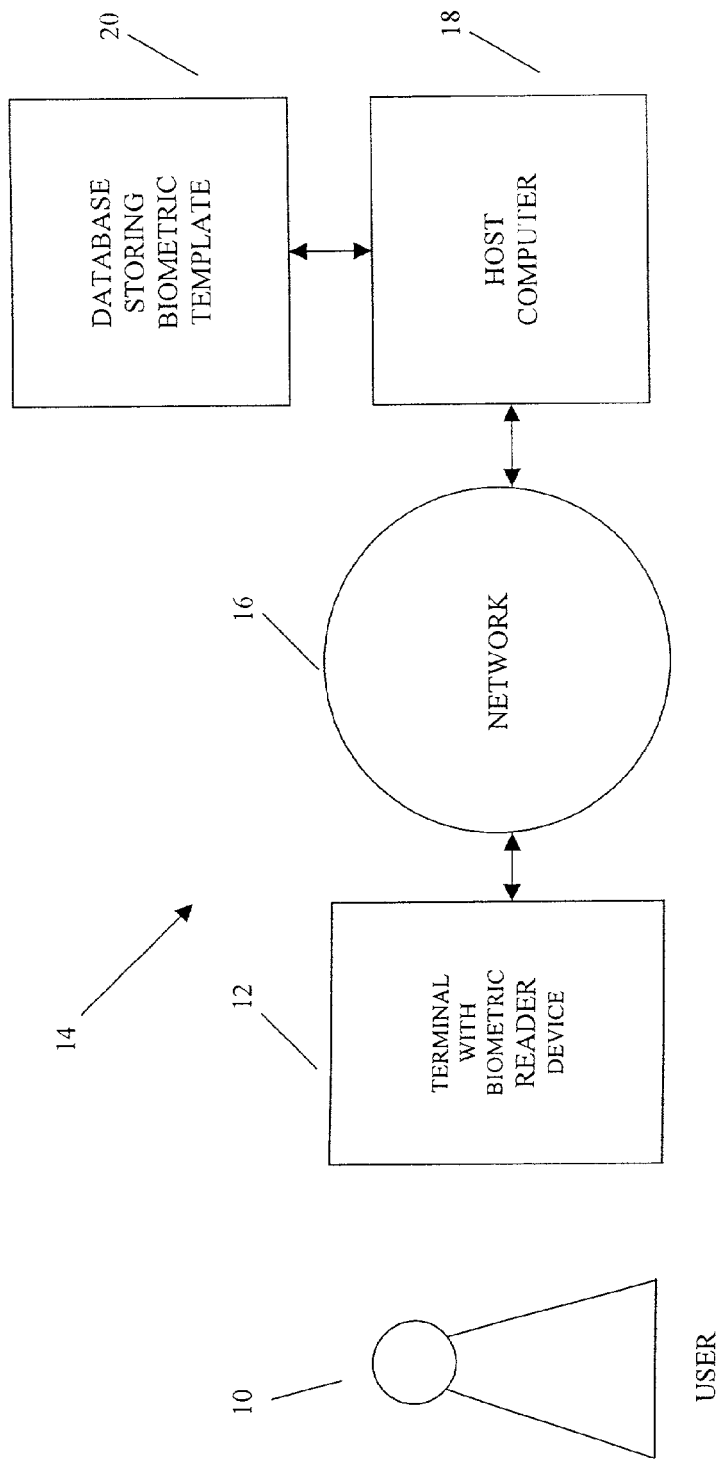
FIG. 1 is a schematic diagram which shows an example of key components and the flow of information between the key components for the authentication method and system for an embodiment of the present invention.

Referring now in detail to an embodiment of the present invention, an example of which is illustrated in the accompanying attachments, FIG. 1 is a schematic diagram which shows an example of key components and the flow of information between the key components for the authentication method and system for an embodiment of the present invention. An aspect of the present invention provides a method and system of authenticating a user 10 to the system 14, such as an ATM system, which makes use of biometric data, which is what the user 10 is, and additional information, which is what the user 10 knows, for example, by presenting the biometric in a predefined manner, such as a predetermined sequence.

FIG. 2 is a table which illustrates examples of credentials, which represent what the user is or has, and shared secrets, which represent what the user knows, for the authentication method and system of an embodiment of the present invention. The predefined manner in which the biometric 26 is presented, such as presenting the user's fingerprints 28 in a predetermined sequence 46, functions as the user's PIN 44. Thus, the user's fingerprints 28 are what the user 10 has, and the sequence 46 in which they are presented is what the user 10 knows. The method and system for user authentication identification for an embodiment of the present invention uses biometric data 26 and the predetermined sequence 46 of presenting the biometric data 26 in order to gain access to a device, physical location, or network.

This authentication method may be augmented by requesting an additional shared secret, such as a PIN 44, or additional credentials, such as documentation 36, thus establishing multiple layers of authentication. Varying the layers of authentication results in greater or lesser security. Additionally, with multiple layers of authentication, the accuracy for any given layer can be relaxed without compromising the integrity of the entire method. In order to minimize the risk of replay attack, the predetermined sequence 46 may be different for consecutive accesses. The authentication process can be executed between the user 10 and a smart card or a trusted network. In a situation where the user 10 is in danger, a separate sequence 46 may be presented to alert the authentication system 14 that the user 10 is in danger.

In addition to presentation and comparison of a biometric 26, such as a fingerprint 28, an aspect of an embodiment of the present invention involves the use, for example, of presentation and comparison of additional biometrics 26, such as the user's voice 30 or face 32, a document 36, or perhaps a PIN 44, in effect, combining biometrics 26 and PIN 44 or other information in a single process. When the user 10 comes to the system 14 and presents a biometric 26, such as the user's fingerprint 28, the way in which the user 10 presents the fingerprint 28 is unique to the particular user 10. Further, only the particular user 10 knows the way he or she presents the fingerprint 28.

For example, in an embodiment of the present invention, the user's fingerprint 28 can be presented in particular time sequences 46, such as having the user present the same finger once and then remove it and present it again and then remove it again. The system 14 knows the specific sequence 46 which, like a PIN 44, identifies the particular user's knowledge. Alternatively, the user 10 may present perhaps two or three fingerprints 28, such as first finger, then third finger, and then second finger, which is analogous to entering the numerals for a PIN 44. Another alternative aspect involves, for example, in addition to use of a fingerprint sequence 46, the system 14 can be preprogrammed to ask for some other additional information to help in the authentication process, such as a PIN 44.

Additionally, the system 14 for an embodiment of the present invention can be preprogrammed to randomly ask the user 10 to present additional credentials out of previously enrolled credentials to prevent a replay attack that might be attempted to defeat the authentication process. In order to avoid such a replay attack, some part of the secret is generated by the system 44 and another part is the shared secret 42 between the user 10 and the system 44 or authority. Thus, the authentication process is different each time, and if a third party records the sequence 46 and replays it, it will not work. A replay attack involves, for example, capturing the shared secret sequence 46, such as a fingerprint sequence 46, by a recording device and attempting to defeat the authentication process by replaying the sequence 46.

Authenticating the user 10, for example, to open the user's door at home requires a relatively low level of security, and it may be adequate for the user 10 who wants a biometric authentication system to install a system which is based on the traditional approach, such as presenting one of the user's fingers for comparison of the fingerprint 28 with a system-stored template. For additional security, an embodiment of the present invention involves presentation and comparison, for example, of the fingerprint 28 of one finger and then another finger, to make it a little more secure.

For much greater security, an embodiment of the present invention involves, for example, one or more of presentation and comparison of the user's face 32 with a system-stored template, a visual comparison of the user 10 with a photograph by a security person, and/or presentation of fingerprints 28 in a certain sequence 46. As an alternative for greater security, an embodiment of the present invention involves, for example, presenting different biometrics 26, such as the user's face 32, then fingerprint 28, then iris 34 for comparison with system-stored templates in a particular sequence 46.

An embodiment of the present invention also makes use of biometric authentication in combination, for example, with real or digital documents 36, such as certificates, passports, digital signatures, and anything else in addition to what a user usually presents. By presenting these additional things, the probability of acceptance of the user 10 is increased, and each of these particular presentations may not be required to be as highly secure as it would normally be required. Assume, for example, that the user 10 presents his face 32 to the system 14 and says 'I am this person.' It is necessary to create a very high quality recognition system to understand that the picture is actually the person whose face 32 is presented to be able to compare it and to verify it properly.

Likewise, if the user 10 presents a fingerprint 28 to the system 14 and says, 'I am this person,' it is necessary to have a template of the user's fingerprint 28 created in the best environment available. In addition, the user's finger should be presented under the best possible conditions. For example, the presented finger should have no cuts, it should not be wet, and/or it should be at the proper temperature. If all of this occurs properly, then the system 14 may be able to accept the user's fingerprint 28 with the desired level of security. However, if the user 10 presents the user's fingerprint 28, and a digital certificate 40, and the user's face 32, and perhaps something else in addition to the fingerprint 28, and if they are presented in a proper sequence 46, then it is not necessary for each of these parameters to be created in the best possible way, as would be necessary if only the user's fingerprint 28 were presented.

Figure 3:
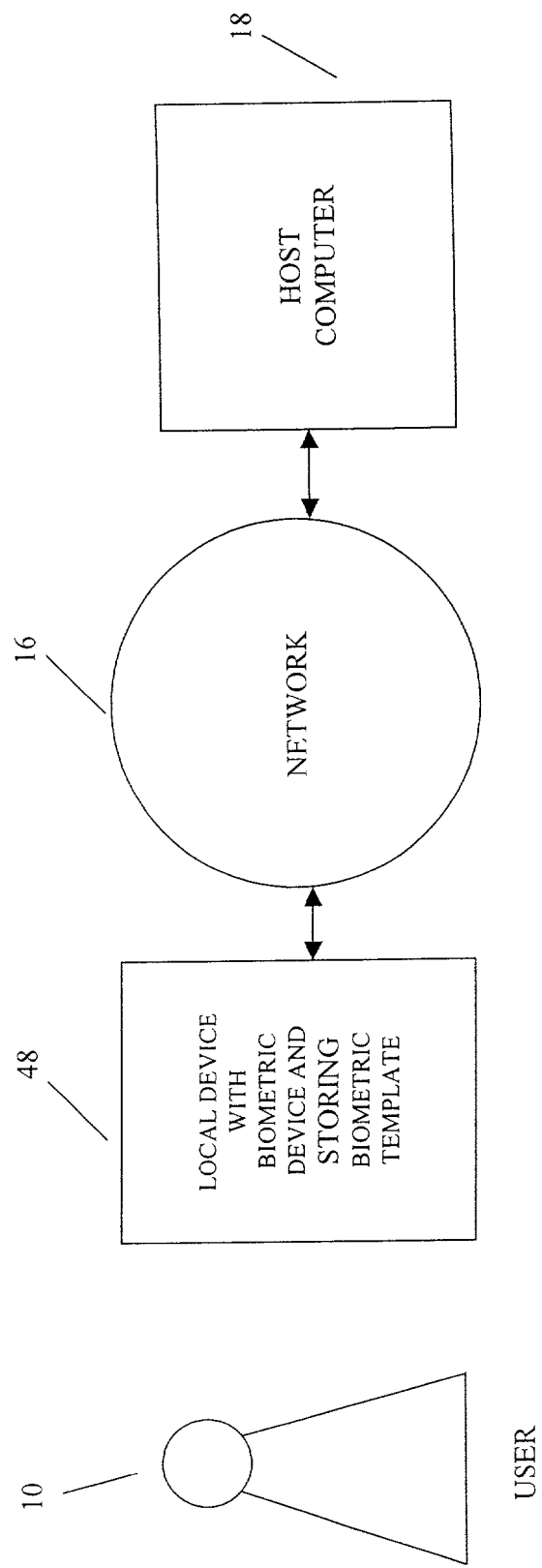
FIG. 3 is a schematic diagram which illustrates an example of key components and the flow of information of a system storing authentication parameters in a local system for an embodiment of the present invention.

In an embodiment of the present invention, those parameters can be stored in a particular device. However, is it not necessary that they be stored in a particular device. FIG. 3 is a schematic diagram which illustrates an example of key components and the flow of information of a system storing authentication parameters in a local system for an embodiment of the present invention. An aspect of an embodiment of the present invention makes use of a centralized system 14 as shown in FIG. 2, but the application for an embodiment of the present invention can equally well be stored in a local device 48 as shown in FIG. 3. In any event, the parameters, thresholds or scores, or the way the templates are organized, are in one way or another stored in a central system 14 or a local device 48.

Another aspect of an embodiment of the present invention involves storing the parameters in the place where the particular verification actually occurs. In a system, for example, which verifies everything on a smart card, the user authenticates himself or herself to the smart card. However, in most cases, after the user authenticates himself or herself via the smart card, the user must still authenticate the smart card to something else.

Figure 4:
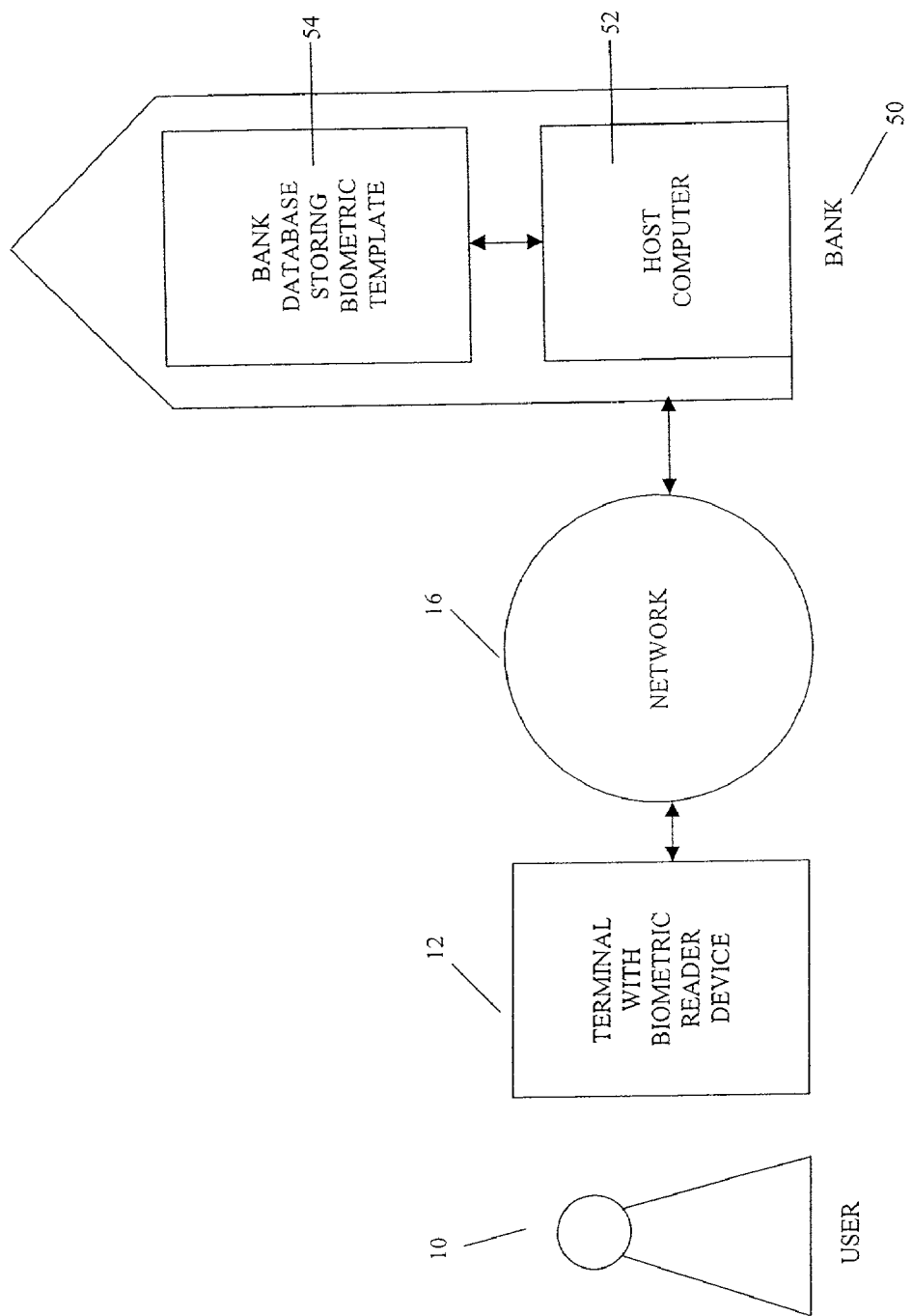
FIG. 4 is a schematic diagram which illustrates an example of key components and the flow of information between the key components of a bank's system storing authentication parameters for an embodiment of the present invention.

Assume, for example, that the user needs to do authentication to a merchant or to a bank. FIG. 4 is a schematic diagram which illustrates an example of key components and the flow of information between the key components of a bank's system storing authentication parameters for an embodiment of the present invention. If the user's bank 50 has all the parameter information stored in the bank's database 54, the user 10 can present his or her face 32, fingerprint 28, and/or certificate, and all of this information can be authenticated through the bank 50 where the user 10 actually wants to authenticate himself or herself. Of course, a bank or a merchant can attempt to authenticate the user 10 in another place, with the user saying, in effect, 'I have this information about me in another place,' such as bank 50. If the merchant believes this is true and/or, for example, has a relationship with the bank 50, it can go through the authentication also.

For example, referring to FIG. 4, assume that the user 10 goes to a place, such as the merchant with a terminal 12, and says to the merchant, 'I want to buy something from you.' The merchant says 'Okay, can you prove that you are the person who you say you are? The user 10 responds, 'I cannot prove it to you, but I can prove it to my bank.' If the user 10 has a relationship with the bank 50, and if the merchant also has a relationship with the bank 50, then the user 10 and the merchant can go together to the bank 50. The bank 50 acts as a sort of arbitrator which says, 'Okay, you people are really the people who you say you are.' That means that the merchant can go to the bank 50 and verify that this particular user 10 who wants to buy something from the merchant actually belongs to the bank 50 and is capable of paying. This merchant-user-single bank entity relationship is referred to as a three-corner model.

Figure 5:
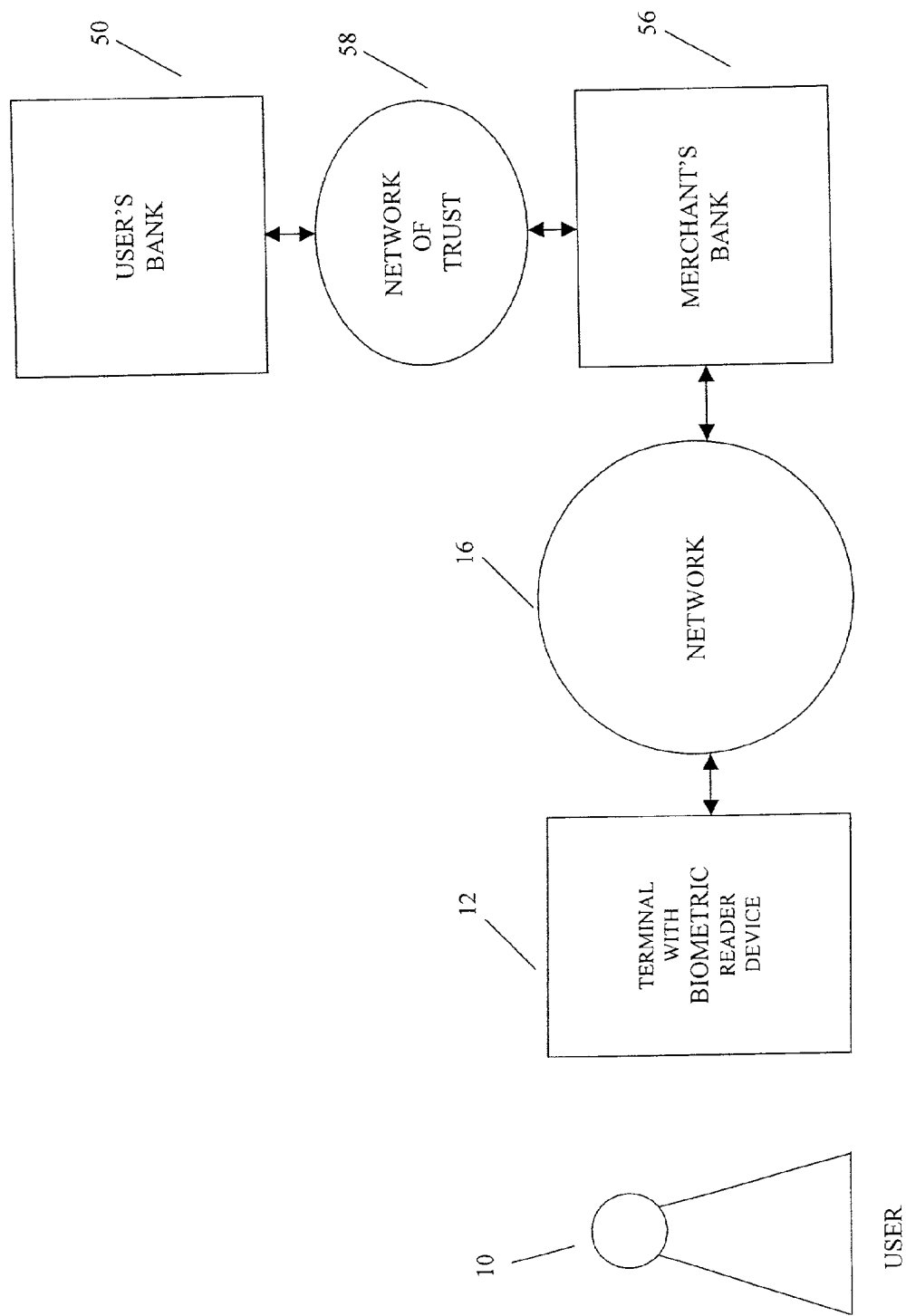
FIG. 5 is a schematic diagram which illustrates an example of key components and the flow of information between the key components of an authentication system with a four-corner network of trust for an embodiment of the present invention.

An aspect of an embodiment of the present invention also involves expanding the relationship from a merchant-user-single bank entity relationship to a network of trust, for example, where all of the participants in the authentication process belong to the same association or the same network of trust. FIG. 5 is a schematic diagram which illustrates an example of key components and the flow of information between the key components of an authentication system with a four-corner network of trust for an embodiment of the present invention. Thus, the user 10 can have a relationship with the bank 50 which shares the same network of trust 58 with another bank 56 with which the merchant has a relationship. In other words, the user 10 and the merchant have relationships with different banks 56, 50, but the different banks share a trusted network 58, and the same authentication process can be used.

For example, referring to FIG. 5, we have the user's bank 50, the merchant's bank 56, the user 10, and the merchant, and the two banks 56, 50 are different. With the network of trust 58 established between the two banks 56, 50, the same authentication process can be used even though the user 10 has a relationship with a different bank from the merchant. Further, the network of trust 58 can include any number of banks. If the user 10 related to one bank 50 wishes to authenticate to the merchant related to another bank 56, in order to accomplish the four corner model, the user 10 goes to the merchant's terminal 12 and passes his or her credentials 24 through the merchant's terminal 12 in a predefined sequence 46. If it is within a trusted area 58, the merchant passes that sequence 46 to the merchant's bank 56, and the merchant's bank 56 passes that sequence 46 to the user's bank 50. The user's bank 50 identifies the user 10, and the authentication is passed back to the merchant. In such case, the merchant's bank 56 acts as a sort of proxy in the authentication process.

Referring again to FIG. 4, an embodiment of the present invention makes use, for example, of a terminal 12 to which the user 10 presents his or her information 24, such as biometrics 26, at certain times in a certain sequence 46. Assume that the user 10 comes to a merchant and wants to buy something, and that the merchant has a terminal 12 which the user 10 knows that he or she can trust. Obviously, it is very important that the user 10 will not provide his or her information 24 to a terminal that he or she should not trust. The user 10 sees that there is a terminal 12 that he or she can trust, and the user 10 can present his or her information 24. It is important that this information 24 is not identified at the particular terminal 12 but is passed to something that the merchant and the user 10 both together trust, such as the bank 50. The bank 50 makes the decision that this particular user 10 is exactly who he or she says and has enough money in his or her account that the merchant can accept the user's promise to pay.

Figure 6:
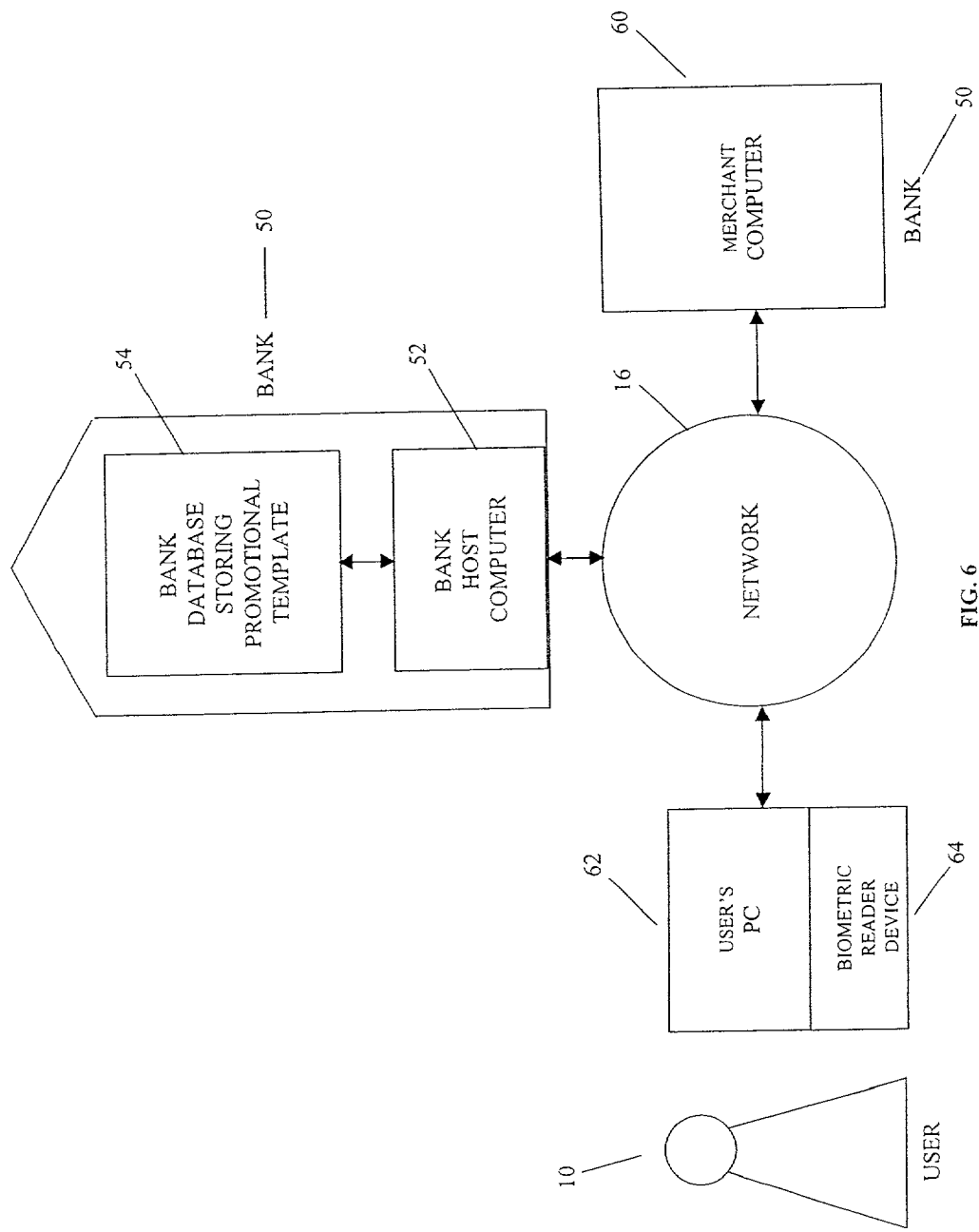
FIG. 6 is a schematic diagram which illustrates and example of key components and the flow of information between the key components of a three-corner authentication system for an embodiment of the present invention with the user at a terminal such as the user's PC.

One way of accomplishing this is simply by the user presenting his or her credit card in the presence of the merchant, as is presently done today. However, in an embodiment of the present invention, another way of accomplishing this is that if the user 10 is trying to buy something from the merchant but, for example, is sitting at home at a terminal 12, such as the user's personal computer (PC), the user 10 needs to communicate to the merchant in a way in which he or she feels comfortable. FIG. 6 is a schematic diagram which illustrates and example of key components and the flow of information between the key components of a three corner authentication system for an embodiment of the present invention with the user at a terminal such as the user's PC. The merchant 60 does not verify the user's fingerprint 28 but passes the fingerprint 28 to the bank 50 to which both the user 10 and the merchant 60 belong. The bank 50 verifies that the user 10 is who he or she says and confirms the particular transaction.

On the user's side, the user 10 is at his or her PC 62 at home and has, for example, a device 64 attached to the PC 62, which can accept the user's fingerprint 28. The user 10 applies, for example, one finger, and then applies another finger, and sends all this information 24 to the merchant 60, and the merchant 60 passes this information 24 to the bank 50. Based, for example, on the user's name and fingerprint or fingerprints 28 presented, the bank 50 verifies that the user 10 is who he or she says and also verifies the sequence 46 in which the user 10 presented his or her fingerprint or fingerprints 28. This is the user's PIN 44, which should be good enough for the bank 50 to make a decision that the user 10 is who he or she claims to be, safely and securely, and to authorize the transaction.

Figure 7:
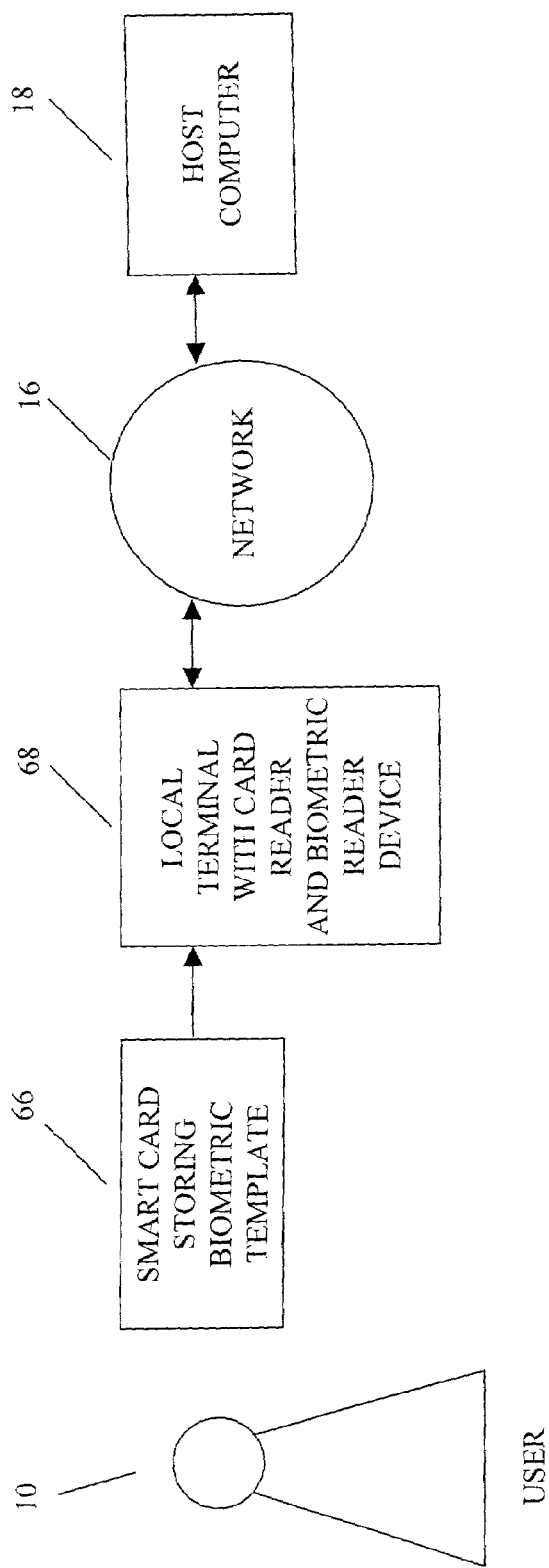
FIG. 7 is a schematic diagram with illustrates an example of key components and the flow of information between the key components of an authentication system for an embodiment of the present invention with credentials, such as a biometric template, stored on a smart card.

An aspect of an embodiment of the present invention involves storing the authentication information, such as a biometric template, that is normally stored at the host computer 52 at the bank 50, for example, on a smart card. FIG. 7 is a schematic diagram with illustrates an example of key components and the flow of information between the key components of an authentication system for an embodiment of the present invention with credentials, such as a biometric template, stored on a smart card. When the authentication information is stored on the smart card 66, the user 10 can identify himself or herself to the particular smart card 66. In some cases, that is a secure enough process, but in many cases identify himself or herself to that smart card 66, that basically verifies that the particular user 10 is the person who is actually using the smart card 66 and is okay.

Codes are used to open the smart card 66. For example, the user 10 presents his or her fingerprint 28 to the smart card 66 and presents a PIN 44 to the smart card 66 and opens the smart card 66, and the smart card 66 has enough information to be secure. Assume that the user 10 has, for example, a digital signature or digital certificate 40 which was signed by someone else. The user 10 can use that particular digital signature 40 safely sitting on the user's smart card 66 to authenticate himself or herself, but basically the user's smart card 66, to the host computer 18. On the other hand, in an embodiment of the present invention, the user 10 can present his or her biometric information 26 with the user's PIN 44 to the host computer 18 as shown in FIG. 1, and the smart card 66 is not needed. Thus, it is not necessary for the user 10 to have the smart card 66 or anything else, but simply to present himself or herself, and it becomes unnecessary to authenticate the smart card 66 and then solve some other problem to prove that it was signed by the proper authority and that the authority is trusted and the like.

A smart card aspect of an embodiment of the present invention can make use of an application which enables adjustment of the threshold depending on the environment. Thus, if a more secure application is wanted, the threshold is moved in a direction to prevent false acceptances, and for a less secure application, the threshold can be relaxed up to the point that virtually any time the user 10 presents a biometric 26, he or she is accepted. In an embodiment of the present invention, the threshold can be adjusted, additional information can be presented by the user 10, and the threshold can be certified and re-locked to make the smart card 66 work in a more secure way even if the threshold is locked.

After the smart card 66 is authenticated, it is not a particular benefit to the user 10 to authenticate to the user's own smart card 66, since the user 10 already knows to his or own satisfaction that it is the user's own smart card 66. However, the point is that no one else can use the user's smart card 66. After the user 10 authenticates himself or herself to the smart card 66, then the user 10 needs to authenticate the smart card 66 to the host computer 18. In an aspect of an embodiment of the present invention, the user 10 can go directly to the host computer 18 and authenticate himself or herself without the smart card 66. However, the modality that the smart card 66 serves in an embodiment of the present invention is that security people of organizations, such as financial institutions, typically want two authenticating items rather than a single authenticating item.

On the other hand, in an embodiment of the present invention, the user 10 can present his or her biometrics 26, which is who the user 10 is, and the user 10 can present his or her PIN 44 in the form of the sequence 46 of the biometric presentation, which is what only the user knows, so that there are those two authenticating items. If one takes the position that the security people would like to have something physical, while the user's fingerprint 28 is physical, it is not an element issued by the financial institution, such as a PIN 44 issued by the financial institution. Yet, it may be considered something physical, in that the financial institution knows the particular sequence 46 of biometrics presentation, which is a form of the PIN 44.

Figure 8:
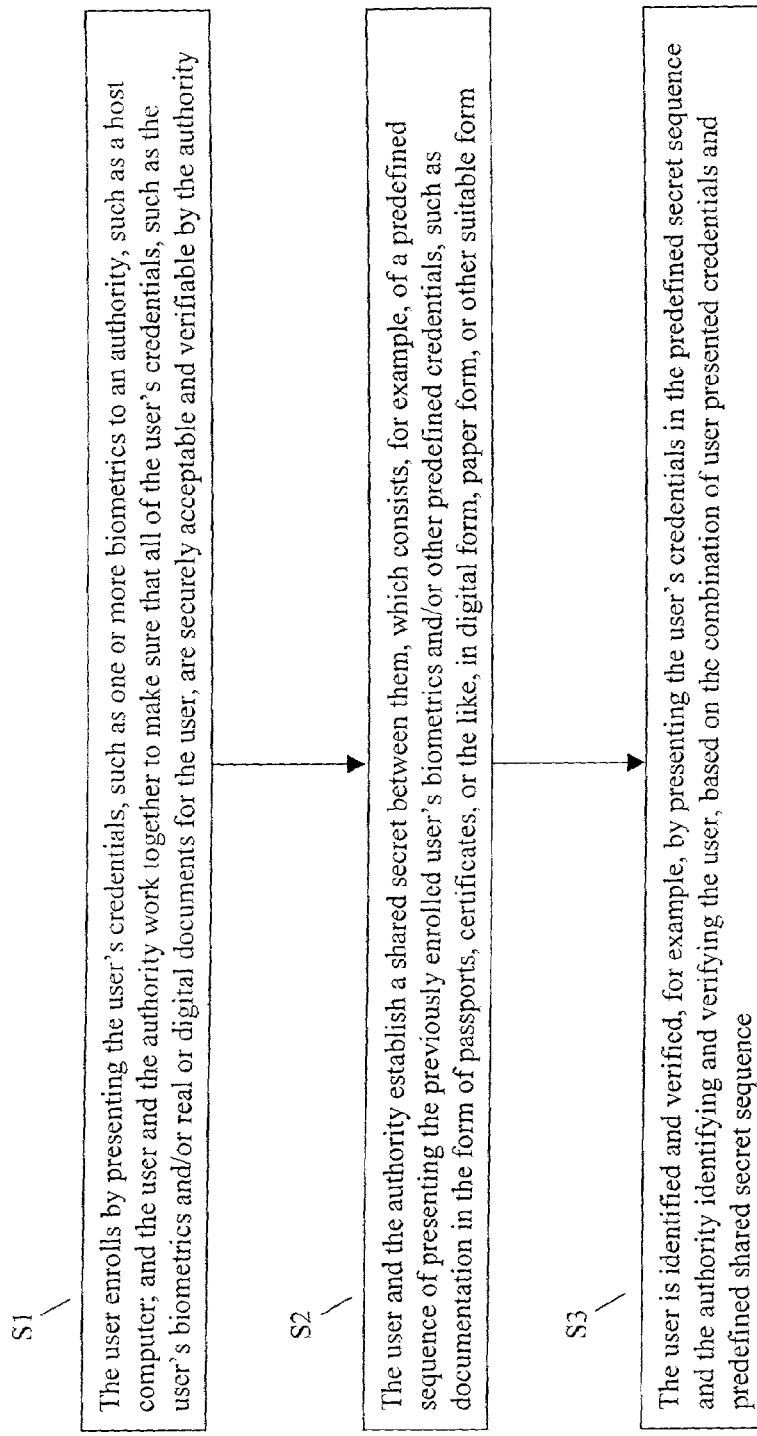
FIG. 8 is a flow chart which illustrates an example of the process of user authentication for an embodiment of the present invention.

The user authentication process for an embodiment of the present invention includes, for example, user enrollment, the establishment of a shared secret 42, and identification and verification of the user 10. FIG. 8 is a flow chart which illustrates an example of the process of user authentication for an embodiment of the present invention. At S1, the user 10 enrolls by presenting the user's credentials 24, such as one or more biometrics 26 to an authority, such as a host computer 18. The user 10 and the authority work together to make sure that all of the user's credentials 24, such as the user's biometrics 26 and/or real or digital documents 36 for the user 10, are securely acceptable and verifiable by the authority 18. These credentials 24 represent what the user is or has.

At S2, a shared secret 42 is established between the user 10 and the authority 18, which consists, for example, of a predefined sequence 46 of presenting the previously enrolled user's biometrics 26 and/or other predefined credentials 24, such as documentation 36 in the form of passports, certificates, or the like, in digital form 40, paper form 38, or other suitable form. The sequence 46 of presenting the credentials 24 represents what the user 10 and the authority 18 know. At S3, identification and verification of the user 10 involve, for example, the user 10 presenting the user's credentials 24 in the predefined secret sequence 46 and the authority 18 identifying and verifying the user 10 based on the combination of user presented credentials 24 and predefined shared secret sequence 46. In an aspect of an embodiment of the present invention, user credentials 24, such as fingerprints 28, can be relaxed in the foregoing user authentication process, because of the pre-defined shared secret 42. For example, the thresholds for acceptance of each fingerprint template can be lowered, and imposters will still be rejected, because imposters will not know the predefined shared secret 42.

In an embodiment of the present invention, the verification parameters of user credentials 24, such as threshold levels for matching of fingerprints 28, the quality of scanners, or the tolerance to input biometrics 26, such as the case of cuts on a user's finger, can be controlled by the authority, such as the host computer 18, in the user authentication process, depending on the risk of the application run by the authority 18 and the strength of the predefined shared secret 42. The strength of the secret 42 is controlled by the authority 18 and forces the user 10 to present the user's credentials 24 under the directions of the authority 18. For a lower level of security, this can be by presenting one or more fingerprints 28. For a higher level of security, it can be verification of fingerprints 28, voice 30, and iris 34 of the user 10 in the predefined sequence 46. At the same time, the authority 18 can adjust the threshold levels for each biometric template to a lower or higher level to allow a desired level of control of the secure access.

In an aspect of the user authentication process for an embodiment of the present invention, the authority, such as host computer 18 is a financial organization, such as a bank 50, and the user's digital credentials 40 or copies of the user's actual documents 36 are stored in a database 54 of the bank 50. The shared secret 42 is known as the user's PIN 44 and is stored in the same database 54. The user 10 can present the user's credential to the bank 50 in the predefined shared secret sequence 46 and receive, for example, all bank services. The system for an embodiment of the present invention is designed in such a way that the representatives of the authority 18 do not know the shared secrets 42 of the user 10, although it is stored in the authority's database 54. For example, the shared secret 42 can be stored encrypted and digitally signed.

In another aspect of user authentication for an embodiment of the present invention, the user 10 has one or more shared sequences 46 with the authority 18 so that a silent alarm can be activated if the user 10 is in danger. In a further aspect of user authentication for an embodiment of the present invention, the user 10 has one or more shared sequences 46 with the authority 18, so that the authority 18 can request which sequence 46 to use to prevent a replay attack. In an additional aspect of user authentication for an embodiment of the present invention, the authority 18 can randomly request the user 10 to present additional credentials out of previously enrolled credentials 24 to prevent a replay attack.

In yet a further aspect of user authentication for an embodiment of the present invention, the authority 18 takes the form of a user token, such as a smart card 66. The user credentials 24, such as fingerprints 28, are stored in the user's smart card 66. The shared secret 42 is also stored on the smart card 66. The user 10 can present his credentials 24 to the smart card 66 in the predefined shared secret sequence 46 and open the smart card 66 for its normal usage. In this aspect, the user's credentials 24, such as biometric templates, digital certificates, and the like, verification parameters, and shared secrets 42 can be signed with the user's private key and stored locally for fraud prevention, such as smart card tampering.

In still another aspect of user authentication for an embodiment of the present invention, the authority 18 is in the form of a local device 48, such as a front gate controller, garage opener, telephone or television activator, or the like. The local device 48 has its own secure local database or may use a remote database for additional security. The user credentials 24, such as fingerprints 28, are stored in the database of the local device 48, together with the shared secret 42. The user 10 can present the credentials 24 to the local device 48 in the predefined shared secret sequence 46 and open or activate the local device 48 for its normal usage.

Various preferred embodiments of the present invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A method for authenticating the identity of a user by an authority, comprising:
enrolling a plurality of credentials for the user with the authority;
establishing at least one shared secret between the user and the authority relating to a predefined shared secret manner for presenting each of a plurality of current user credentials to the authority for the user for consecutive occasions;

receiving at least one currently presented user credential by the authority for authentication of the identity of the user;

authenticating an identity of the user by the authority based on a correspondence between the enrolled and current user credentials and a correspondence between the shared secret manner for presenting the current user credential and the manner in which the current user credential is presented to the authority;

wherein receiving the current user credential further comprises receiving at least one additional currently presented user credential by the authority; and wherein receiving the current user credential further comprises receiving at least one additional currently presented user credential by the authority in one of a plurality of randomly selected predefined shared secret sequences as directed by the authority.

2. The method of claim 1, wherein enrolling the user credential further comprises receiving the plurality of user credentials by the authority for enrollment.

3. The method of claim 2, wherein receiving the plurality of user credentials for enrollment further comprises storing the plurality of user credentials by the authority.

4. The method of claim 3, wherein storing the plurality of user credentials further comprises storing at least one biometric template for the user.

5. The method of claim 3, wherein storing the plurality of user credentials further comprises storing at least one document for the user.

6. The method of claim 3, wherein storing the plurality of user credentials further comprises storing the plurality of user credentials on one of a host computer, a local terminal, and a smart card for the user.

7. The method of claim 1, wherein enrolling the plurality of user credentials further comprises enrolling at least one biometric template and at least one document for the user.

8. The method of claim 7, wherein enrolling the biometric template further comprises enrolling the biometric template for at least one of a fingerprint template, a face template, a voice template, and an iris template for the user.

9. The method of claim 7, wherein enrolling the document further comprises enrolling at least one of a digital document and a paper document for the user.

10. The method of claim 9, wherein enrolling the digital document further comprises enrolling at least one of a digital certificate and a digital signature for the user.

11. The method of claim 9, wherein enrolling the paper document further comprises enrolling a passport for the user.

12. The method of claim 1, wherein enrolling the plurality of user credentials with the authority further comprises storing user authentication information on a user token for the user.

13. The method of claim 12, wherein storing the information on the user token further comprises storing the user authentication information on a smart card for the user.

14. The method of claim 13, wherein storing the information on the smart card further comprises storing biometric information for the user.

15. The method of claim 14, wherein storing the biometric information for the user further comprises storing biometric information for one of a fingerprint, a face, a voice, and an iris for the user.

16. The method of claim 13, wherein storing the information on the smart card further comprises storing the shared secret for the user on the smart card.

17. The method of claim 13, wherein storing the information on the smart card further comprises storing the authentication information on the smart card signed with a private key for the user.

18. The method of claim 1, wherein establishing the predefined shared secret manner of presenting the user credential further comprises establishing at least one predefined shared secret sequence of presenting the current user credential to the authority.

19. The method of claim 18, wherein establishing the predefined shared secret sequence of presenting the current user credential further comprises establishing the predefined shared secret sequence which functions in a manner analogous to a personal identification number for the user.

20. The method of claim 1, wherein establishing the shared secret further comprises storing information about the shared secret by the authority.

21. The method of claim 20, wherein storing the information about the shared secret by the authority further comprises storing the information about the shared secret and the plurality of user credentials together in a database by the authority.

22. The method of claim 21, wherein storing the information about the shared secret and the plurality of user credentials in the database further comprises storing the information about the shared secret and the plurality of user credentials encrypted and digitally signed.

23. The method of claim 1, wherein establishing the shared secret further comprising establishing at least one additional shared secret between the user and the authority.

24. The method of claim 23, wherein establishing the additional shared secret further comprises establishing a predefined shared secret personal identification number for the user.

25. The method of claim 23, wherein establishing the additional shared secret further comprises establishing at least one additional predefined shared secret manner of presenting the current user credential to the authority for the user.

26. The method of claim 23, wherein establishing the additional shared secret further comprises establishing a predefined shared secret manner of presenting at least one additional current user credential to the authority for the user.

27. The method of claim 1, wherein establishing the predefined shared secret manner of presenting of each of the plurality of current user credentials further comprises establishing a variation of the predefined shared secret manner of presenting each of the current user credentials to the authority for the user corresponding to a variation in a degree of security.

28. The method of claim 1, wherein receiving the currently presented user credential further comprises receiving the current user credential by the authority in a predefined shared secret sequence.

29. The method of claim 1, wherein receiving the currently presented user credential further comprises receiving a current biometric sample by the authority.

30. The method of claim 29, wherein receiving the current biometric sample by the authority further comprises receiving a current biometric sample for one of a fingerprint, a face, a voice, and an iris for the user.

31. The method of claim 1, wherein receiving the currently presented user credential further comprises receiving the current user credential by the authority from the user in a shared secret manner directed by the authority.

32. The method of claim 38, wherein receiving the current user credential in the manner directed by the authority further comprises directing the user by the authority to present a biometric sample for at least one user fingerprint.

33. The method of claim 31, wherein receiving the current user credential in the manner directed by the authority further comprises directing the user by the authority to present a combination of biometric samples for at least two of a user fingerprint, a user face, a user voice, and a user iris in a predefined shared secret sequence.

34. The method of claim 1, wherein receiving the current user credential further comprises receiving at least one additional currently presented user credential by the authority in a manner directed by the authority.

35. The method of claim 1, wherein authenticating the identity of the user by the authority further comprises authenticating the identity of the user by one of a host computer and a local device.

36. The method of claim 35, wherein authenticating the identity of the user by the local device further comprises authenticating the identity of the user for activation one of a gate controller, a door opener, a telephone, and an appliance.

37. The method of claim 1, wherein authenticating the identity of the user by the authority further comprises authenticating the identity of the user based on the enrolled user credential and the shared secret manner for presenting the current user credential stored together in one of a local database and a remote database of the authority.

38. The method of claim 1, wherein authenticating the identity of the user by the authority further comprises authenticating the identity of the user in order for access to one of a device, a physical location, and a network.

39. The method of claim 1, wherein authenticating the identity of the user by the authority further comprises authenticating the identity of the user to a smart card.

40. A method for authenticating the identity of a user by an authority, comprising:
  enrolling at least one credential for the user with the authority;
  establishing at least one shared secret between the user and the authority relating to a predefined shared secret manner for presenting a current user credential to the authority;
  receiving at least one currently presented user credential by the authority for authentication of the identity of the user;
  authenticating an identity of the user by the authority based on a correspondence between the enrolled and current user credentials and a correspondence between the shared secret manner for presenting the current user credential and the manner in which the current user credential is presented to the authority;
  wherein establishing the shared secret further comprises establishing at least one additional shared secret between the user and the authority;
  wherein establishing the additional shared secret further comprises establishing a predefined shared secret manner of presenting each of a plurality of additional current user credentials to the authority for the user; and
  wherein establishing the predefined shared secret manner of presenting each of the plurality of additional current user credentials further comprises establishing a variation of the predefined shared secret manner of presenting each of the additional current user credentials to the authority for the user for consecutive occasions.

41. A method for authenticating the identity of a user by an authority, comprising:
  enrolling a plurality of credentials for the user with the authority;
  establishing at least one shared secret between the user and the authority relating to a predefined shared secret manner for presenting each of a plurality of current user credentials to the authority for the user for consecutive occasions;
  receiving at least one currently presented user credential by the authority for authentication of the identity of the user;
  authenticating an identity of the user by the authority based on a correspondence between the enrolled and current user credentials and a correspondence between the shared secret manner for presenting the current user credential and the manner in which the current user credential is presented to the authority; and
  wherein authenticating the identity of the user by the authority further comprises authenticating the identity of the user to activate a silent alarm for the user.

42. A system for authenticating the identity of a user by an authority, comprising:
  means for enrolling a plurality of credentials for the user with the authority;
  means for establishing at least one shared secret between the user and the authority relating to a predefined shared secret manner for presenting each of a plurality of current user credentials to the authority for the user for consecutive occasions;
  means for receiving at least one currently presented user credential by the authority for authentication of the identity of the user;
  means for authenticating an identity of the user by the authority based on a correspondence between the enrolled and current user credentials and a correspondence between the shared secret manner for presenting the current user credential and the manner in which the current user credential is presented to the authority;
  wherein the means for receiving the current user credential further comprises means for receiving at least one additional currently presented user credential by the authority; and
  wherein the means for receiving the current user credential further comprises means for receiving at least one additional currently presented user credential by the authority in one of a plurality of randomly selected predefined shared secret sequences as directed by the authority.

43. The system of claim 42, wherein the means for enrolling the user credential further comprises means for receiving the plurality of user credentials by the authority for enrollment.

44. The system of claim 43, wherein the means for receiving the plurality of user credentials for enrollment further comprises means for storing the plurality of user credentials by the authority.

45. The system of claim 44, wherein the means for storing the plurality of user credentials further comprises means for storing at least one biometric template for the user.

46. The system of claim 44, wherein the means for storing the plurality of user credentials further comprises means for storing at least one document for the user.

47. The system of claim 44, wherein the means for storing the plurality of user credentials further comprises means for storing the plurality of user credentials on one of a host computer, a local terminal, and a smart card for the user.

48. The system of claim 42, wherein the means for enrolling the plurality of user credentials further comprises means for enrolling at least one biometric template and at least one document for the user.

49. The system of claim 48, wherein the means for enrolling the biometric template further comprises means for enrolling the biometric template for at least one of a fingerprint template, a face template, a voice template, and an iris template for the user.

50. The system of claim 48, wherein the means for enrolling the document further comprises means for enrolling at least one of a digital document and a paper document for the user.

51. The system of claim 50, wherein the means for enrolling the digital document further comprises means for enrolling at least one of a digital certificate and a digital signature for the user.

52. The system of claim 50, wherein the means for enrolling the paper document further comprises means for enrolling a passport for the user.

53. The system of claim 42, wherein the means for enrolling the plurality of user credentials with the authority further comprises means for storing user authentication information on a user token for the user.

54. The system of claim 53, wherein the means for storing the information on the user token further comprises means for storing the user authentication information on a smart card for the user.

55. The system of claim 54, wherein the means for storing the information on the smart card further comprises means for storing biometric information for the user.

56. The system of claim 55, wherein the means for storing the biometric information for the user further comprises means for storing biometric information for one of a fingerprint, a face, a voice, and an iris for the user.

57. The system of claim 54, wherein the means for storing the information on the smart card further comprises means for storing the shared secret for the user on the smart card.

58. The system of claim 54, wherein the means for storing the information on the smart card further comprises means for storing the authentication information on the smart card signed with a private key for the user.

59. The system of claim 42, wherein the means for establishing the predefined shared secret manner of presenting the user credential further comprises means for establishing at least one predefined shared secret sequence of presenting the current user credential to the authority.

60. The system of claim 59, wherein the means for establishing the predefined shared secret sequence of presenting the current user credential further comprises means for establishing the predefined shared secret sequence which functions in a manner analogous to a personal identification number for the user.

61. The system of claim 42, wherein the means for establishing the shared secret further comprises means for storing information about the shared secret by the authority.

62. The system of claim 61, wherein the means for storing the information about the shared secret by the authority further comprises means for storing the information about the shared secret and the plurality of user credentials together in a database by the authority.

63. The system of claim 62, wherein the means for storing the information about the shared secret and the plurality of user credentials in the database further comprises means for storing the information about the shared secret and the plurality of user credentials encrypted and digitally signed.

64. The system of claim 42, wherein the means for establishing the shared secret further comprising establishing at least one additional shared secret between the user and the authority.

65. The system of claim 64, wherein the means for establishing the additional shared secret further comprises means for establishing a predefined shared secret personal identification number for the user.

66. The system of claim 64, wherein the means for establishing the additional shared secret further comprises means for establishing at least one additional predefined shared secret manner of presenting the current user credential to the authority for the user.

67. The system of claim 64, wherein the means for establishing the additional shared secret further comprises means for establishing a predefined shared secret manner of presenting at least one additional current user credential to the authority for the user.

68. The system of claim 42, wherein the means for establishing the predefined shared secret manner of presenting of each of the plurality of current user credentials further comprises means for establishing a variation of the predefined shared secret manner of presenting each of the current user credentials to the authority for the user corresponding to a variation in a degree of security.

69. The system of claim 42, wherein the means for receiving the currently presented user credential further comprises means for receiving the current user credential by the authority in a predefined shared secret sequence.

70. The system of claim 42, wherein the means for receiving the currently presented user credential further comprises means for receiving a current biometric sample by the authority.

71. The system of claim 70, wherein the means for receiving the current biometric sample by the authority further comprises means for receiving a current biometric sample for one of a fingerprint, a face, a voice, and an iris for the user.

72. The system of claim 42, wherein the means for receiving the currently presented user credential further comprises means for receiving the current user credential by the authority from the user in a shared secret manner directed by the authority.

73. The system of claim 72, wherein the means for receiving the current user credential in the manner directed by the authority further comprises means for directing the user by the authority to present a biometric sample for at least one user fingerprint.

74. The system of claim 72, wherein the means for receiving the current user credential in the manner directed by the authority further comprises means for directing the user by the authority to present a combination of biometric samples for at least two of a user fingerprint, a user face, a user voice, and a user iris in a predefined shared secret sequence.

75. The system of claim 42 wherein the means for receiving the current user credential further comprises means for receiving at least one additional currently presented user credential by the authority in a manner directed by the authority.

76. The system of claim 42, wherein the means for authenticating the identity of the user by the authority further comprises means for authenticating the identity of the user by one of a host computer and a local device.

77. The system of claim 76, wherein the means for authenticating the identity of the user by the local device further comprises means for authenticating the identity of the user for activation one of a gate controller, a door opener, a telephone, and an appliance.

78. The system of claim 42, wherein the means for authenticating the identity of the user by the authority further comprises means for authenticating the identity of the user based on the enrolled user credential and the shared secret manner for presenting the current user credential stored together in one of a local database and a remote database of the authority.

79. The system of claim 42, wherein the means for authenticating the identity of the user by the authority further comprises means for authenticating the identity of the user in order for access to one of a device, a physical, location, and a network.

80. The system of claim 42, wherein the means for authenticating the identity of the user by the authority further comprises means for authenticating the identity of the user to a smart card.

81. A system for authenticating the identity of a user by an authority, comprising:
   means for enrolling at least one credential for the user with the authority;
   means for establishing at least one shared secret between the user and the authority relating to a predefined shared secret manner for presenting a current user credential to the authority;
   means for receiving at least one currently presented user credential by the authority for authentication of the identity of the user;
   means for authenticating an identity of the user by the authority based on a correspondence between the enrolled and current user credentials and a correspondence between the shared secret manner for presenting the current user credential and the manner in which the current user credential is presented to the authority;
   wherein the means for establishing the shared secret further comprises means for establishing shared secret between the user and the authority;
   wherein the means for establishing the additional shared secret further comprises means for establishing a predefined shared secret manner of presenting each of a plurality of additional current user credentials to the authority for the user; and
   wherein the means for establishing the predefined shared secret manner of presenting each of the plurality of additional current user credentials further comprises means for establishing a variation of the predefined shared secret manner of presenting each of the additional current user credentials to the authority for the user for consecutive occasions.

82. A system for authenticating the identity of a user by an authority, comprising:
   means for enrolling a plurality of credentials for the user with the authority;
   means for establishing at least one shared secret between the user and the authority relating to a predefined shared secret manner for presenting each of a plurality of current user credentials to the authority for the user for consecutive occasions;
   means for receiving at least one currently presented user credential by the authority for authentication of the identity of the user;
   means for authenticating an identity of the user by the authority based on a correspondence between the enrolled and current user credentials and a correspondence between the shared secret manner for presenting the current user credential and the manner in which the current user credential is presented to the authority; and
   wherein the means for authenticating the identity of the user by the authority further comprises means for authenticating the identity of the user to activate a silent alarm for the user.

* * * * *

UNITED STATES PATENT AND TRADEMARK OFFICE
CERTIFICATE OF CORRECTION

PATENT NO. : 7,039,812 B2 Page 1 of 1
APPLICATION NO. : 09/769844
DATED : May 2, 2006
INVENTOR(S) : Joseph C. Kawan, Yosif Smushkovich and Ronald King-Hang Chu It is certified that error appears in the above-identified patent and that said Letters Patent is hereby corrected as shown below:

IN THE CLAIMS:

In Column 13, Line 1, please change "32. The method of claim 38, wherein receiving the current" to -- 32. The method of claim 31, wherein receiving the current --

In Column 17, Line 13, please change "the user in order for access to one of a device, a physical," to -- the user in order for access to one of a device, a physical --

Signed and Sealed this

Fifteenth Day of August, 2006

JON W. DUDAS
*Director of the United States Patent and Trademark Office*